SNIDER & GORTON.
Stove Lining.
No. 31,266.
Patented Jan'y 29, 1861.
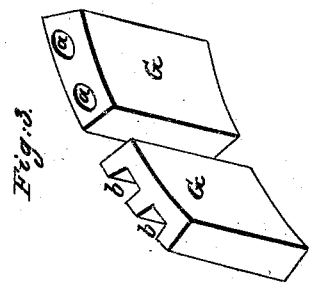
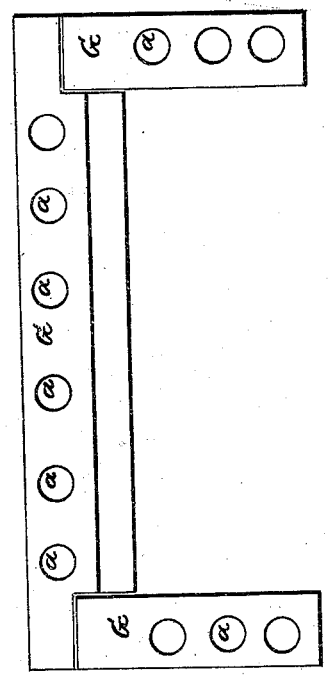
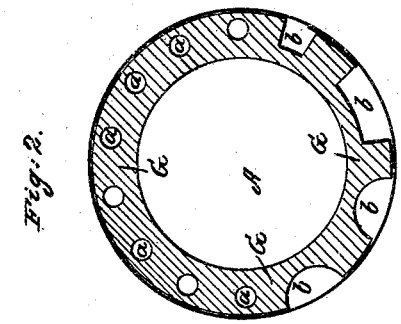
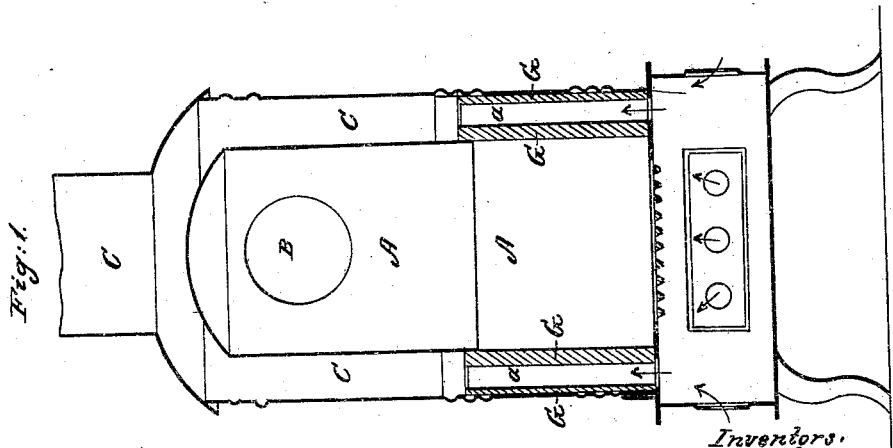

UNITED STATES PATENT OFFICE.

G. B. SNIDER AND JAS. GORTON, OF YORKVILLE, NEW YORK.

STOVE-LINING.

Specification of Letters Patent No. 31,266, dated January 29, 1861.

*To all whom it may concern:*

Be it known that we, G. B. SNIDER and JAMES GORTON, of Yorkville, in the city, county, and State of New York, have invented a new and useful Improvement in Stove-Lining; and we do hereby declare that the following is a full, clear, and exact description thereof, reference being had to the accompanying drawings, making a part of this specification, in which—

Figure 1, is a vertical sectional elevation of a drum stove in which the improved lining is shown. Fig. 2, is a horizontal section taken through the fire box of Fig. 1, representing three varieties of lining. Fig. 3, shows sections of the lining. Fig. 4, shows the flat lining, for oven-stoves, ranges, etc.

Similar letters of reference indicate corresponding parts in the several figures.

Our invention is intended to be applied only to that class of stoves or heaters in which the fire pot is composed of fire brick, clay, stone or other non conducting substance.

The object of our invention is to prevent the air from becoming too highly heated and also, while providing space for the admission of the air to save the expense of an inner metallic drum to hold the parts of the fire pot together. The usual method of construction when the air is to be warmed by contact with the exterior of the fire pot is to make the said fire pot of iron. But this is a defective method because the air is thus brought in contact with highly heated metallic surfaces whereby the air is vitiated and rendered detrimental to health. In some stoves that have the fire pot composed of brick, a space is left for the admission of air between the fire pot and the exterior drum. This construction requires the employment of an inner drum to serve as a supporting band or pot in which the brick composing the lining are placed.

Our improvement consists in constructing the stones, bricks, clay or other non-conducting substance of which the fire pot linings is composed with air passages in them thus avoiding the use of the inner drum and also preventing the air from becoming too highly heated.

To enable those skilled in the art to make and use our invention we will proceed to describe its construction and operation.

Fig. 1, serves to illustrate the application of our invention to an ordinary drum stove from which hot air is conducted up into another apartment for warming purposes. This stove is for this purpose, constructed with a fire and a smoke chamber A, which leads off into the chimney through passage B, and a hot air chamber C, which leads off into other compartments in the same story or in the one above. The fire is built in chamber A, which is surrounded with the new lining G, and when this lining becomes heated, cold air will rush in at the bottom of the stove, as indicated by the arrows, Fig. 1, and pass up between the lining G and the outer stove plate, or it will pass up through the lining, become hot, and escape at the top of the stove, or this hot air may be conducted wherever it may be required.

The stove lining G, is more clearly represented in Figs. 2, 3 and 4. It is made of serpentine, or any other suitable substance, and in blocks of any desirable shape to suit the kind of stove to which it is to be applied. These blocks whatever shape they may be have holes $a$, drilled through them in a direction with their length, or what would effect the same object, deep channels $b$, may be formed in their backs which channels may be made of any desirable width and shape. These channels or grooves may be made parallel with the longer edges of the blocks or they may be made in serpentine curves from the bottom to the top edges of the blocks. These channels, grooves, or perforations, may be readily cut with a chisel as the stone generally used is quite soft, or if the blocks are formed of clay and afterward burned, the channels may be still more easily formed. These channels have ribs the surfaces of which come in contact with the outer stove plates which support the lining, which plates form one side of the channels or conduits for the passage of air up through the sides of the fire chamber of the stove. Thus there are alternate air channels, or spaces, and ribs around the outside or back of the lining, or between the lining, and as this surface of the lining is greatly increased, an increased air heating surface is obtained, besides, where channels are formed on the outer surface of the lining the surfaces of the ribs only will touch the stove plate, consequently these plates will wear much longer as the plates will be to a great degree protected from the red hot lining.

Having thus described our invention, what we claim and desire to secure by Letters Patent is—

The lining provided with air passages connecting with the hot air chamber, in the particular manner and for the purpose set forth.

GEORGE B. SNIDER.
JAMES GORTON.

Witnesses:
GEORGE B. PAYNE,
JOHN MAHONEY.